(12) United States Patent
Cheng et al.

(10) Patent No.: US 9,465,200 B2
(45) Date of Patent: Oct. 11, 2016

(54) LENS POSITIONING STRUCTURE FOR ZOOM LENS

(71) Applicant: Hong Kong Applied Science and Technology Research Institute Co. Ltd., Shatin, N.T. (HK)

(72) Inventors: Kwok Sing Cheng, New Territories (HK); Kin Ming Fan, Kowloon (HK)

(73) Assignee: Hong Kong Applied Science and Technology Research Institute Co., Ltd., Shatin, New Territories (HK)

( * ) Notice: Subject to any disclaimer, the term of this patent is extended or adjusted under 35 U.S.C. 154(b) by 373 days.

(21) Appl. No.: 13/789,555

(22) Filed: Mar. 7, 2013

(65) Prior Publication Data

US 2014/0254028 A1    Sep. 11, 2014

(51) Int. Cl.
| | | |
|---|---|---|
| G02B 15/14 | (2006.01) | |
| G02B 13/00 | (2006.01) | |
| G02B 7/10 | (2006.01) | |
| G03B 3/10 | (2006.01) | |
| G03B 5/00 | (2006.01) | |

(52) U.S. Cl.
CPC ............. *G02B 13/009* (2013.01); *G02B 7/102* (2013.01); *G03B 3/10* (2013.01); *G03B 5/00* (2013.01); *G03B 2205/0053* (2013.01)

(58) Field of Classification Search
CPC ...................... H04N 1/0678; H04N 2213/001; H04N 5/2254; H04N 5/23287; G03F 7/70183; F16M 11/043; F16M 11/045; F16M 11/046; F16M 11/425; G03B 2205/0092; G03B 3/10; G03B 5/00; G03B 2205/0053; H02K 41/031; H02K 41/0356; G02B 13/009; G02B 7/102
USPC ......................................... 359/691, 699, 700
See application file for complete search history.

(56) References Cited

U.S. PATENT DOCUMENTS

| | | | |
|---|---|---|---|
| 5,832,317 | A | 11/1998 | Shimizu |
| 6,825,991 | B2 | 11/2004 | Takanashi et al. |
| 7,295,390 | B2 | 11/2007 | Miki |
| 7,518,806 | B2 | 4/2009 | Hu et al. |
| 2010/0086291 | A1* | 4/2010 | Kim et al. ..................... 396/79 |
| 2012/0063007 | A1 | 3/2012 | Imagawa et al. |

OTHER PUBLICATIONS

CN201310113348.7: First Office Action and English translation sheet, Sep. 29, 2014.
CN201310113348.7 Text of the First Office Action, Sep. 29, 2014.

* cited by examiner

*Primary Examiner* — Alicia M Harrington
(74) *Attorney, Agent, or Firm* — Berkeley Law & Technology Group, LLP

(57) ABSTRACT

An apparatus for adjusting a zoom lens that includes a mechanical structure having a plurality of lens assemblies and an actuator to adjust a zoom level or focus of the apparatus.

22 Claims, 8 Drawing Sheets

LENS POSITIONING STRUCTURE FOR ZOOM LENS

FIELD

The subject matter disclosed herein relates to an optical module that includes a mechanical structure to adjust a zoom level or focus of the optical module.

BACKGROUND

Many portable electronic apparatuses, such as a cellular phone and/or a personal digital assistant (PDA) for example, may comprise a compact camera module. Such a module may comprise an image sensor, an imaging lens assembly, and/or an actuator to adjust the position of the imaging lens assembly with respect to the image sensor. As designers push towards slimmer, smaller, and/or lighter portable electronic apparatuses, compact camera module manufacturers, among others, are facing a challenge of providing smaller compact camera modules that can be manufactured with reduced cost by reducing manufacturing tolerances of an optical system of the camera modules.

BRIEF DESCRIPTION OF THE DRAWINGS

Non-limiting and non-exhaustive embodiments will be described with reference to the following objects, wherein like reference numerals refer to like parts throughout the various objects unless otherwise specified.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

As used to describe such embodiments, terms "above", "below", "upper", "lower", "horizontal", "vertical", and "side" describe positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example. Further, it is understood that such terms do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on. "Horizontal" may refer to an orientation perpendicular to an optical axis while "vertical" may refer to an orientation parallel to the optical axis.

Embodiments described herein include a compact imaging module that provides a mechanism to adjust a zoom level by varying a distance between an image sensor and two or more individual lens assemblies of a zoom lens. For example, a zoom lens may comprise a first lens assembly and a second lens assembly. Descriptive terms "first" and "second" are arbitrarily chosen to describe example embodiments and are not intended to convey a particular meaning or order.

Figure 1:
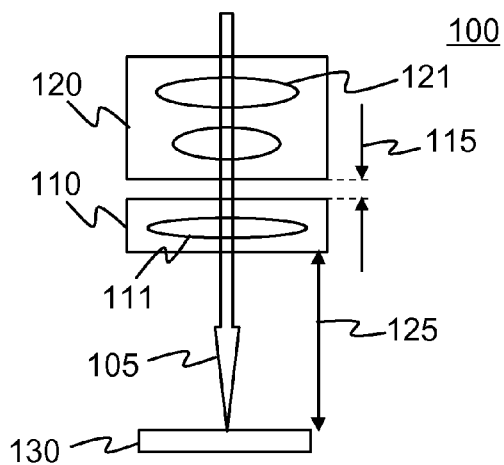
FIGS. 1 and 2 include schematic cross-section views of lens assemblies and an image sensor, according to an embodiment.
Figure 2:
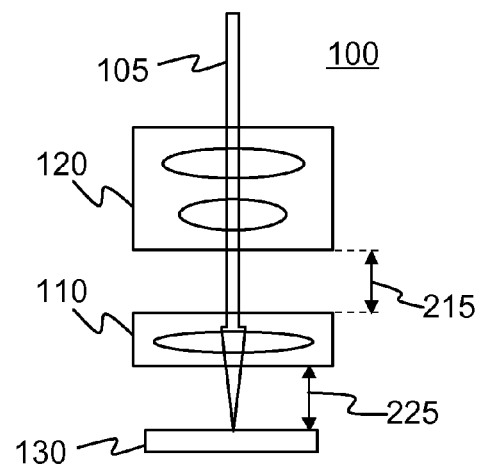

FIGS. 1 and 2 include schematic cross-section views of lens assemblies and an image sensor, according to a particular embodiment 100. Such lens assemblies and image sensor may comprise a portion of a compact imaging device, for example. Arrow 105 represents light traveling through optical elements and impinging on an image sensor 130. A compact imaging module may allow focus or zoom adjustments by selectively changing a distance between individual lens assemblies and an image sensor.

An image sensor may include an active region (not shown) comprising an array of pixilated charge-coupled devices (CCD) and/or one or more complementary metal-oxide-semiconductor (CMOS) devices, just to name a few examples. An image sensor may also comprise an inactive region (not shown) at least partially surrounding an active region. Such an inactive region may comprise a border or frame for an active region that may be used to physically support other portions of a compact imaging module without interfering with light impinging on the active region, for example.

A first lens assembly 110 may comprise one or more optical elements 111, which may comprise one or more lenses, for example. A second lens assembly 120 may comprise one or more optical elements 121, which may comprise one or more lenses, for example. First lens assembly 110 and second lens assembly 120 may operate in combination to provide a particular zoom level. Such a particular zoom level may be based, at least in part, on a distance between first lens assembly 110 and image sensor 130 and a distance between first lens assembly 110 and second lens assembly 120. For example, a zoom level of the configuration of lens assemblies 110 and 120 in FIG. 1 may be based, at least in part, on distance 125 between first lens assembly 110 and image sensor 130 and distance 115 between first lens assembly 110 and second lens assembly 120. Accordingly, a zoom level of the configuration of lens assemblies 110 and 120 in FIG. 2 may be different from the zoom level in FIG. 1 and may be based, at least in part, on distance 225 between first lens assembly 110 and image sensor 130 and distance 215 between first lens assembly 110 and second lens assembly 120.

A distance between one or more lens assemblies and an image sensor, for example, may be adjustable, at least in part, in response to a mechanical force, as described below. A distance may be measured along an optical axis, represented by (e.g., in parallel with) arrow 105, of the lens assemblies. In an implementation, a mechanical force to adjust positions of one or more lens assemblies may be generated by an electric motor, as described below. In a particular embodiment, for example, a structure of a compact imaging module, such as a compact camera module, may provide zoom capability, auto-focus, and/or other imaging functions by adjusting a distance between individual lens assemblies and an image sensor. A compact imaging module may provide an advantage to designers incorporating such a module into increasingly slimmer, smaller, and/or lighter portable electronic apparatuses, such as a compact camera or cell phone, for example. For example, a height of a zoom module in embodiments described below may be relatively small. Of course, such details of a compact imaging module are merely examples, and claimed subject matter is not so limited.

In one embodiment, a compact imaging module may comprise first and second lens assemblies having a combined effective focal length. The term "effective focal length" refers to a focal length of one or more assemblies of individual lenses, as opposed to a focal length of an individual lens. A magnification or zoom level of one or more lens assemblies may be based, at least in part, on the effective focal length of the lens assemblies, which may be based, at least in part, on distances between first and second lens assemblies and image sensor 130. Accordingly, lens assemblies having one effective focal length may produce an image having one zoom level and lens assemblies having another effective focal length may produce an image having another zoom level.

A compact imaging module may comprise an actuator or mechanical power source to move first and second lens assemblies to various positions and various distances between an image sensor and the lens assemblies. Such a mechanical power source may generate torque or other force in response to receiving electrical current. A mechanical power source may comprise an electrical motor or stepper motor, for example. In some implementations, "mechanical power source" or "actuator" refers to a device that converts mechanical energy (or power) from electrical energy (or power). In some implementations, "mechanical power source" refers to an electrical motor and need not include gears, worm drives, screws, or any other type of mechanical elements other than a shaft of the motor, for example.

In one implementation, a single actuator may comprise a motor to move a sliding element along a range of positions in a horizontal direction, perpendicular to an optical axis of one or more lens assemblies. As explained below, a distance between first lens assembly and second lens assembly may be based, at least in part, on a horizontal position of such a sliding element. Moreover, as the sliding element moves in a horizontal direction, the one or more lens assemblies may simultaneously move in a vertical direction, parallel with the optical axis. Such simultaneous movement of lens assemblies and a sliding element may provide a technique for adjusting a distance between first and second lens assemblies and a distance between the individual lens assemblies and an image sensor. Though the term "sliding element" is used, the sliding element may slide and/or roll as it moves along a range of positions in a horizontal direction, for example.

In one implementation, a single actuator may be used to drive a sliding element to various positions and to provide a relatively precise control of motion of the lens assemblies. For example, such an actuator may impart a continuous motion to a sliding element so that distance between first and second lens assemblies may be adjusted by any amount. In a similar fashion, distance between first and second lens assemblies and an image sensor may also be adjusted by any amount. Such adjustments may be made, for example, to select a desirable zoom level and to maintain focus of an image of the lens assemblies onto the image sensor. Of course, such details of an actuator and lens assemblies are merely examples, and claimed subject matter is not so limited.

In an embodiment, an apparatus for adjusting a zoom level and/or focus of a zoom lens may comprise a first lens assembly including a first set of one or more lenses and a second lens assembly including a second set of one or more lenses. The apparatus may further comprise a single actuator, which may comprise a motor, for example, to mechanically drive the first lens assembly along an optical axis of the first lens assembly. A coupling mechanism responsive to the single actuator may be used to adjust a position of the second lens assembly along the optical axis while simultaneously varying a distance between the first lens assembly and the second lens assembly. In one implementation, such a coupling mechanism may comprise a first contact surface connected to the first lens assembly and a second contact surface connected to the second lens assembly. The first contact surface may be inclined or curved with respect to the second contact surface, for example. A sliding element may be in contact with both the first contact surface and the second contact surface. Such a sliding element may comprise a circular roller, for example. Such a sliding element may change a gap or separation between the first lens assembly and the second lens assembly in a first direction parallel to the optical axis while the sliding element moves in a second direction perpendicular to the first direction.

The single actuator may drive the sliding element to various positions that vary in distance from the optical axis. A separation between the first contact surface and the second contact surface may be based, at least in part, on the distance between the optical axis and the sliding element. Similarly, a separation between the first lens assembly and the second lens assembly may be based, at least in part, on the distance between the optical axis and the sliding element.

The apparatus may further comprise one or more springs to provide a restoring force between the first lens assembly and the second lens assembly. In one implementation, the sliding element may exert a separating force on the first lens assembly and on the second lens assembly and the spring may exert a compressive force on the first lens assembly and on the second lens assembly.

The apparatus may further comprise a guide path, wherein the single actuator may drive, via a screw drive, the sliding element to move along the guide path.

In another embodiment, an apparatus may comprise a first lens assembly comprising a first contact surface and a second lens assembly comprising a second contact surface, wherein the first and the second lens assemblies may be substantially aligned along an optical axis. The first contact surface may be inclined with respect to the second contact surface, for example.

The apparatus may further comprise a sliding element, which may comprise a circular roller, for example, disposed between the first and the second contact surfaces, and a guiding element including a guiding path to guide vertical and horizontal movement of the sliding element. An actuator may be used to move the sliding element along the guiding path so as to simultaneously vary a distance between the first and the second lens assemblies and a position of the first and the second lens assemblies along the optical axis. Accordingly, a separation between the first contact surface and the second contact surface may be based, at least in part, on a distance between the optical axis and the sliding element. Similarly, a separation between the first lens assembly and the second lens assembly may be based, at least in part, on a distance between the optical axis and the sliding element.

Figure 3:
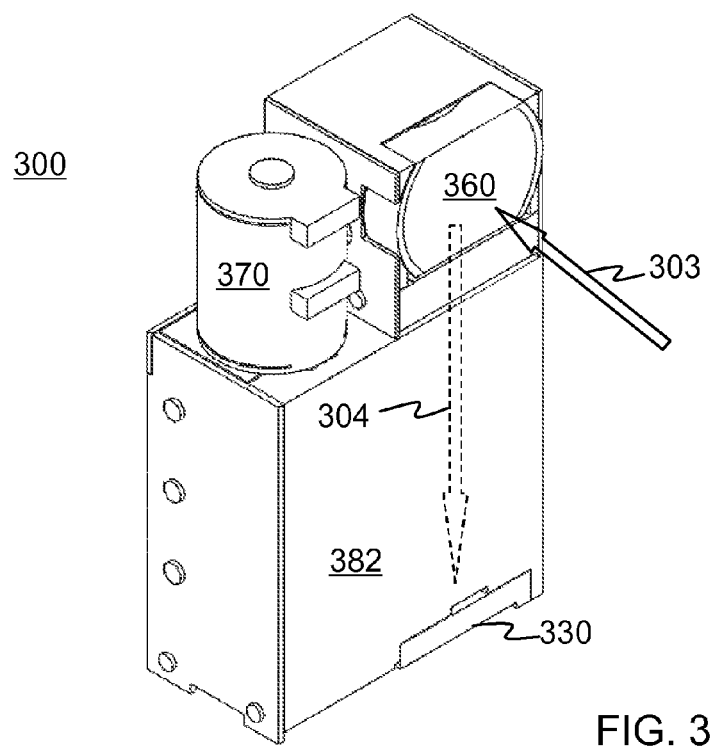
FIG. 3 is a perspective view of a compact imaging module, according to an embodiment.

FIG. 3 is a perspective view of a compact imaging module 300, according to an embodiment. An actuator 370, such as an electric motor or a stepper motor, may be arranged to drive a screw drive (shown in FIG. 6, for example) to adjust distances between various optical components and an image sensor 330, as described below. In one implementation, a compact imaging module may comprise exactly one screw drive, though claimed subject matter need not be limited in this respect.

Compact imaging module 300 may be positioned so that an optical receiver 360 may capture an image. Arrow 303 represents a light path of such an image. In the example embodiment shown, optical receiver 360 may comprise one or more optical components including a mirror (not shown) to redirect light of an image toward an image sensor 330. Arrow 304 represents such a redirected light path. A cover or panel 382 may be used to cover internal components of compact imaging module 300 for protection against foreign material, such as dust, moisture, and so on, for example.

Figure 4A:
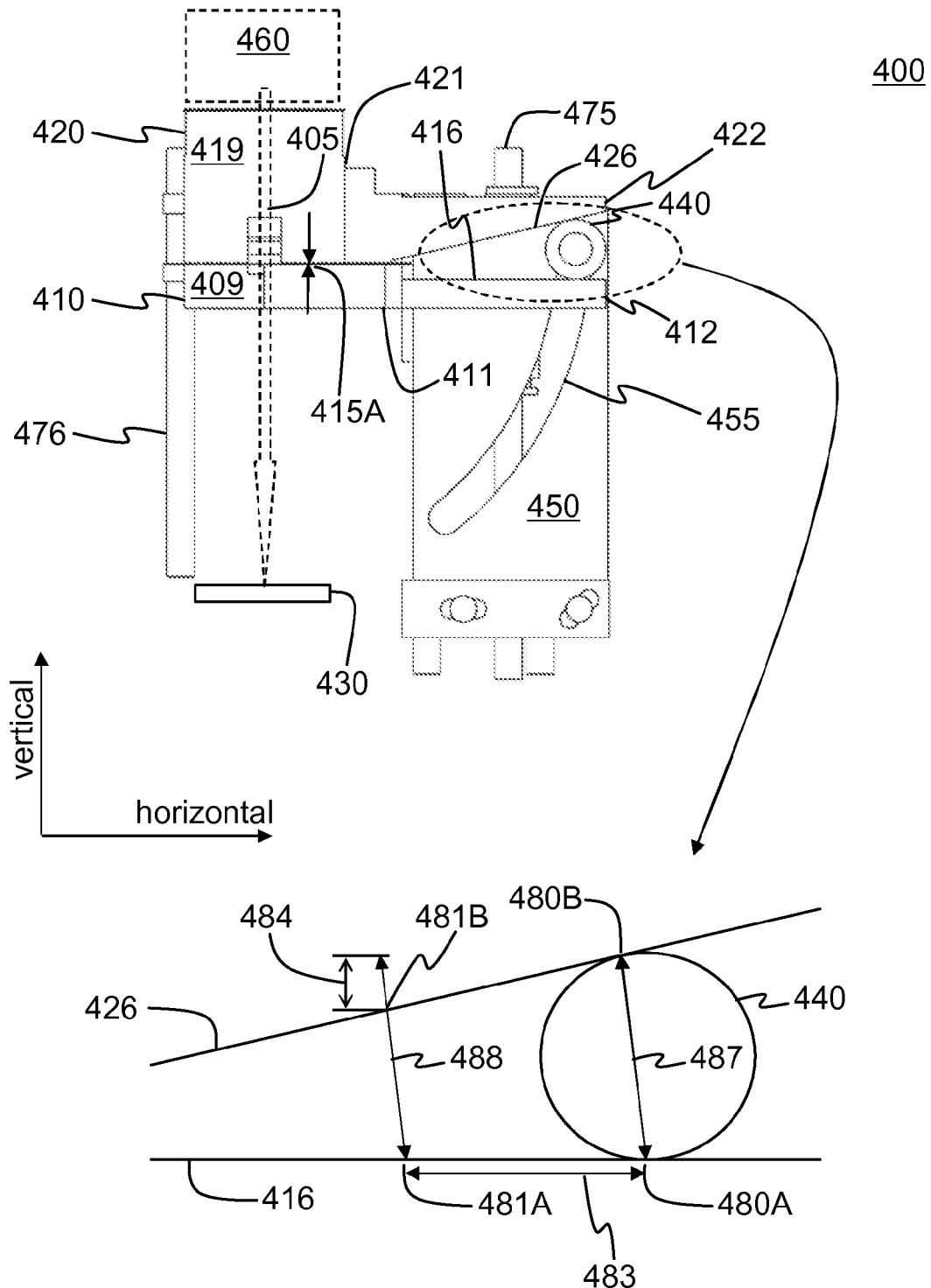
FIGS. 4A, 4B, and 4C are cross-section views of a compact imaging module, according to an embodiment.

FIG. 4A is a cross-section view of a compact imaging module 400, according to an embodiment. FIG. 4A shows reference directions, horizontal and vertical. For example, the vertical direction may be parallel with optical axes of first and second lens assemblies 410 and 420, and the horizontal direction may be perpendicular to the optical axes. Though the terms "horizontal" and "vertical" are used with respect to figures herein, such terms need not correspond to a direction defined by gravity. Compact imaging module 400 may be oriented in any direction, and claimed subject matter is not limited in this respect.

Compact imaging module 400 may be similar to that shown in FIG. 3, for example. An optical receiver 460 may receive light from an image and direct the light through a first lens assembly 410 and a second lens assembly 420 along a light path represented by arrow 405. An optical axis of first lens assembly 410 may be co-linear with an optical axis of second lens assembly 420, which may be parallel to arrow 405. Image sensor 430 may receive light that travels through first lens assembly 410 and second lens assembly 420.

In addition to comprising one or more lens, first lens assembly 410 may also include structural extension 412. For example, first lens assembly 410 may comprise a lens barrel portion 409 that contains one or more lens, and a structural extension 412 that may be physically attached to lens barrel portion 409 at an interface 411. However, in one implementation, structural extension 412 may be molded or fabricated from the same material or structure as lens barrel portion 409. In such a case, an interface 411 need not exist. Also, interface 411 need not be at any particular location, so that a location shown in FIG. 4A is merely an example. To summarize, first lens assembly 410 may comprise a lens barrel portion 409 and a structural extension 412 that are a single structure, or first lens assembly 410 may comprise separate structures that are attached to one another. In either case, a displacement force applied to any part of first lens assembly 410 may affect any other part of first lens assembly 410. For example, a force that displaces structural extension 412 by a particular amount may also displace first lens assembly 410 by the same particular amount.

Similarly, in addition to comprising one or more lens, second lens assembly 420 may also include structural extension 422. For example, second lens assembly 420 may comprise a lens barrel portion 419 that contains one or more lens, and a structural extension 422 that may be physically attached to lens barrel portion 419 at an interface 421. As in the case for first lens assembly 410, in one implementation, structural extension 422 may be molded or fabricated from the same material or structure as lens barrel portion 419. In such a case, an interface 421 need not exist. Also, interface 421 need not be at any particular location, so that a location shown in FIG. 4A is merely an example. To summarize, second lens assembly 420 may comprise a lens barrel portion 419 and a structural extension 422 that are a single structure, or second lens assembly 420 may comprise separate structures that are attached to one another. In either case, a displacement force applied to any part of second lens assembly 420 may affect any other part of second lens assembly 420. For example, a force that displaces structural extension 412 by a particular amount may also displace second lens assembly 420 by the same particular amount.

A sliding element 440, such as a circular roller for example, may be between structural extension 412 of first lens assembly 410 and structural extension 422 of second lens assembly 420. In particular, sliding element 440 may contact and impart a normal force on surface 416 of structural extension 412 and also contact and impart a normal force on surface 426 of structural extension 422. Because surface 426 is inclined with respect to surface 416, as sliding element 440 moves in a horizontal direction, vertical separation between surface 416 and surface 426 may change. Such change in vertical separation may correspond to a change in separation between first lens assembly 410 and second lens assembly 420, since surfaces 416 and 426 are connected to the lens assemblies, as mentioned above. As mentioned above, sliding element 440 may slide and/or roll as it moves along surfaces 416 and 426 in a horizontal direction, for example. Guide rods 476 may be located in two or more locations in compact imaging module 400 to guide first and second lens assemblies as the lens assemblies move vertically.

To explain a relationship between motion of sliding element 440 in a horizontal direction and vertical separation of the lens assemblies, FIG. 4A includes a detailed view of sliding element 440 and surfaces 416 and 426. In one example situation, sliding element 440 may be contacting point 480A of surface 416 and point 480B of surface 426. A separation 487 between points 480A and 480B may be determined by a size of sliding element 440, for example. As sliding element 440 moves horizontally to the left, the sliding element displaces surface 416 and/or surface 426, thus increasing their separation. For example, sliding element 440 moving horizontally to the left by a distance 483 may displace surface 426 (with respect to surface 416) by a vertical distance 484. In particular, sliding element 440 contacting point 481A of surface 416 and point 481B of surface 426 may correspond to a separation 488 between points 481A and 481B. Similarly, as sliding element 440 moves in the horizontal direction, displacement of surface 426 with respect to surface 416 may correspondingly change by a vertical distance.

Compact imaging module 400 may comprise a guide element or plate 450 that includes a guide path 455. An actuator, such as 370 in FIG. 3 for example, may rotate a screw drive 475 to vertically move both first lens assembly 410 and second lens assembly 420. Vertical separation of structural extensions 412 and 422 of the lens assemblies, as explained above, may be determined by a horizontal position of sliding element 440. Sliding element 440 may be mechanically interconnected with guide path 455 so that horizontal motion of sliding element 440 may be dictated by a shape of the guide path 455. For example, a portion (e.g., extending into the "page" in FIG. 4A) of sliding element 440 may ride in guide path 455. Thus, as sliding element 440 follows guide path 455, the sliding element may move both horizontally and vertically, since the guide path may be curved, as shown in FIG. 4A.

Figure 4B:
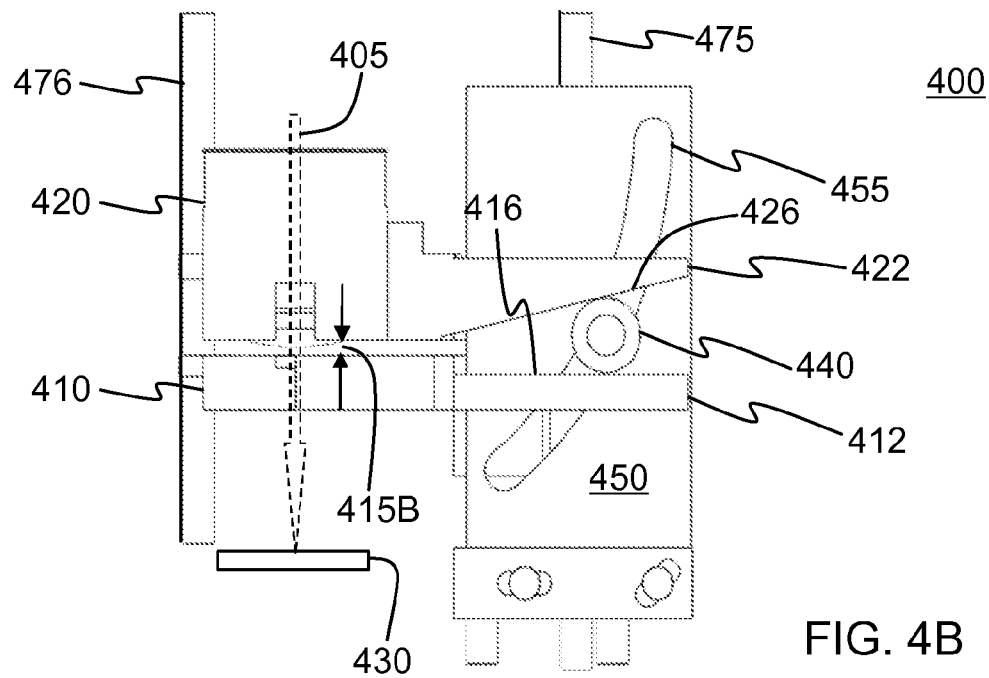
Figure 4C:
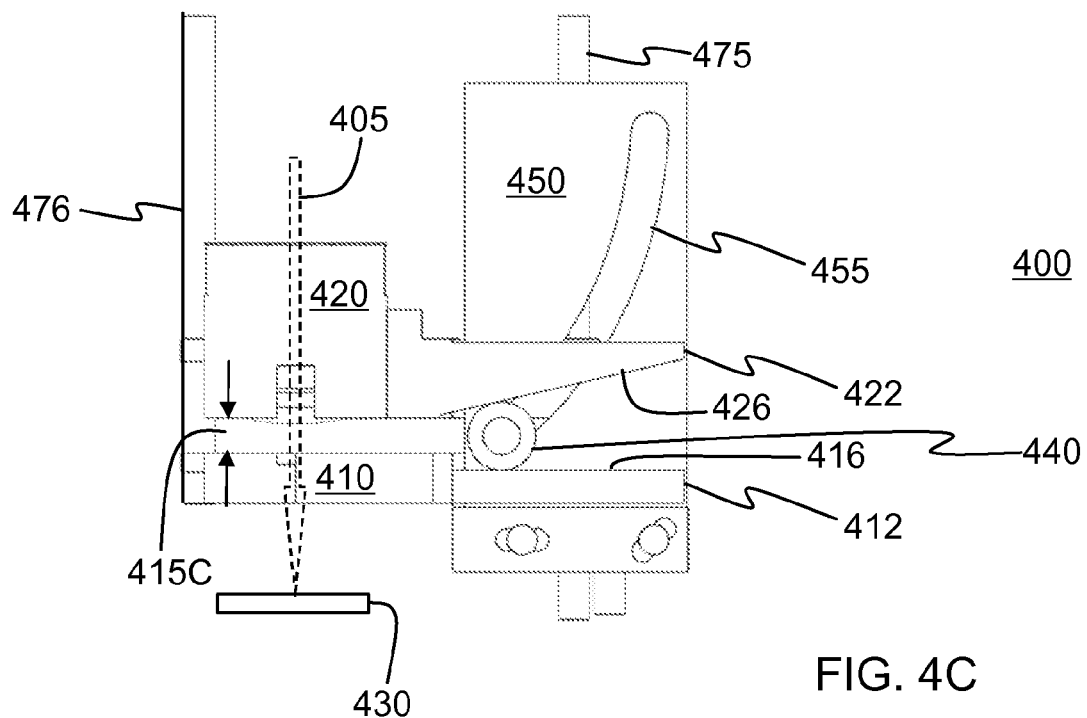

FIG. 4A shows one position of sliding element 440 and a corresponding separation 415A between first lens assembly 410 and second lens assembly 420. FIG. 4B shows another position of sliding element 440 and a corresponding separation 415B between first lens assembly 410 and second lens assembly 420. Similarly, FIG. 4C shows yet another position of sliding element 440 and a corresponding separation 415C between first lens assembly 410 and second lens assembly 420. In these examples, screw drive 475 may rotate to impart vertical motion to first and second lens assemblies 410 and 420. As the lens assemblies move vertically, so does sliding element 440. However, because sliding element 440 follows curved guide path 455, the sliding element simultaneously moves horizontally and vertically. Accordingly, as first and second lens assemblies 410 and 420 move vertically, separation between first and second lens assemblies 410 and 420 may change as sliding element 440 moves horizontally. As explained above, changing separation between first and second lens assemblies 410 and 420 as their distance from image sensor 430 changes may be useful to maintain focus while changing zoom level. Of course, such details of compact imaging module 400 are merely examples, and claimed subject matter is not so limited.

Figure 5A:
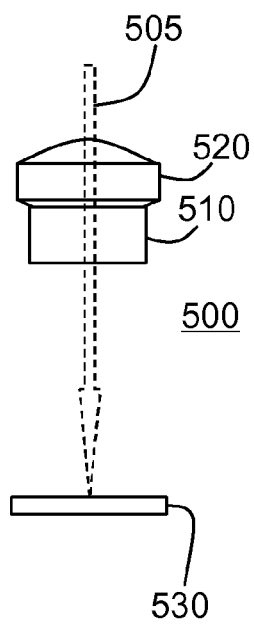
FIGS. 5A, 5B, and 5C are side views of lens assemblies and an imaging sensor, according to an embodiment.
Figure 5B:
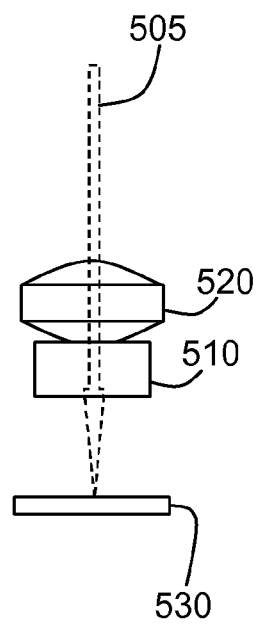
Figure 5C:
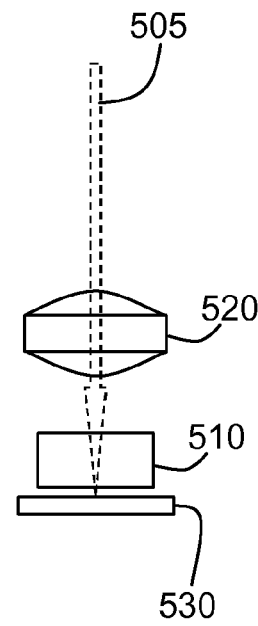

FIGS. 5A, 5B, and 5C are schematic side views of lens assemblies and an imaging sensor, according to an embodiment. For example, FIG. 5A may show relative positions of first lens assembly 510, second lens assembly 520 and image sensor 530 for the case shown in FIG. 4A. Arrow 505 indicates an optical axis of the lens system, for example. Relative positions of the lenses in FIG. 5A may correspond to a "zoom in" image magnification, for example.

Likewise, FIG. 5B may show relative positions of first lens assembly 510, second lens assembly 520 and image sensor 530 for the case shown in FIG. 4B. Similarly, FIG. 5C may show relative positions of first lens assembly 510, second lens assembly 520 and image sensor 530 for the case shown in FIG. 4C. Relative positions of the lenses in FIG. 5C may correspond to a "zoom out" image magnification, for example.

Figure 6:
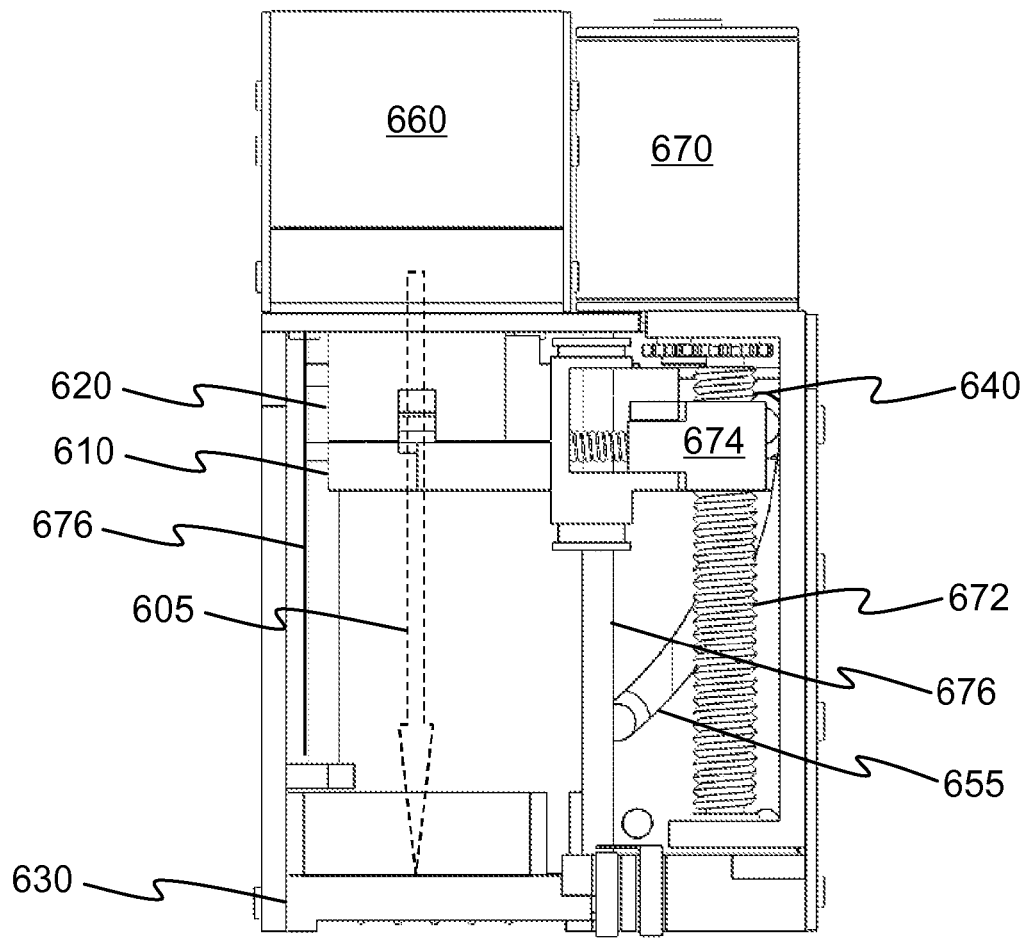
FIG. 6 is a cross-section view of a compact imaging module, according to an embodiment.

FIG. 6 is a cross-section view of a compact imaging module 600, according to an embodiment. Compact imaging module 600 may be similar to that shown in FIGS. 4A, 4B, and 4C, for example. However, wherein FIG. 6 may show a rear view of compact imaging module 600, FIGS. 4A, 4B, and 4C may show a front view of the compact imaging module 600. An optical receiver 660 may receive light from an image and direct the light through a first lens assembly 610 and a second lens assembly 620 along a light path represented by arrow 605. An optical axis of first lens assembly 610 may be co-linear with an optical axis of second lens assembly 620, which may be parallel to arrow 605. Image sensor 630 may receive light that traveled through first lens assembly 610 and second lens assembly 620.

Though not shown in FIG. 6, in addition to each comprising one or more lens, first and second lens assemblies 610 and 620 may also include structural extensions, as in the case for compact imaging module 400, for example. As explained above, horizontal motion of a sliding element 640 may impart a vertical separation between first and second lens assemblies 610 and 620. Sliding element 640 may ride in guide path 655. An actuator 670 may rotate a screw drive 672 to vertically move both first lens assembly 610 and second lens assembly 620. A mechanical element 674 may be threaded to ride screw drive 672 and, as a result, to impart vertical motion to both the first and second lens assemblies. Guide rods 676 may be located in one or more locations in compact imaging module 600 to guide first and second lens assemblies and mechanical element 674 as the lens assemblies and mechanical element move vertically. In an implementation, for example, the length of screw drive 672 may be substantially the same or larger than the travel distance of the lens assemblies. Relatively small screw drive pitch may have a number of advantages. For example, movement resolution may be increased for a lens assembly traveling along an optical axis. As the screw pitch decreases, more turns of the screw would need to be rotated to obtain the same amount of vertical movement (e.g., an increase in resolution of vertical movement). For an example of another advantage, the force to drive mechanical element 674 may be reduced for relatively small screw drive pitch. For a smaller pitch, the slope of each screw thread and the thread of the mechanical element 674 may also be smaller. Accordingly, the force needed to drive the mechanical element 674 may be reduced as the slope of the screw thread is reduced.

Figure 7:
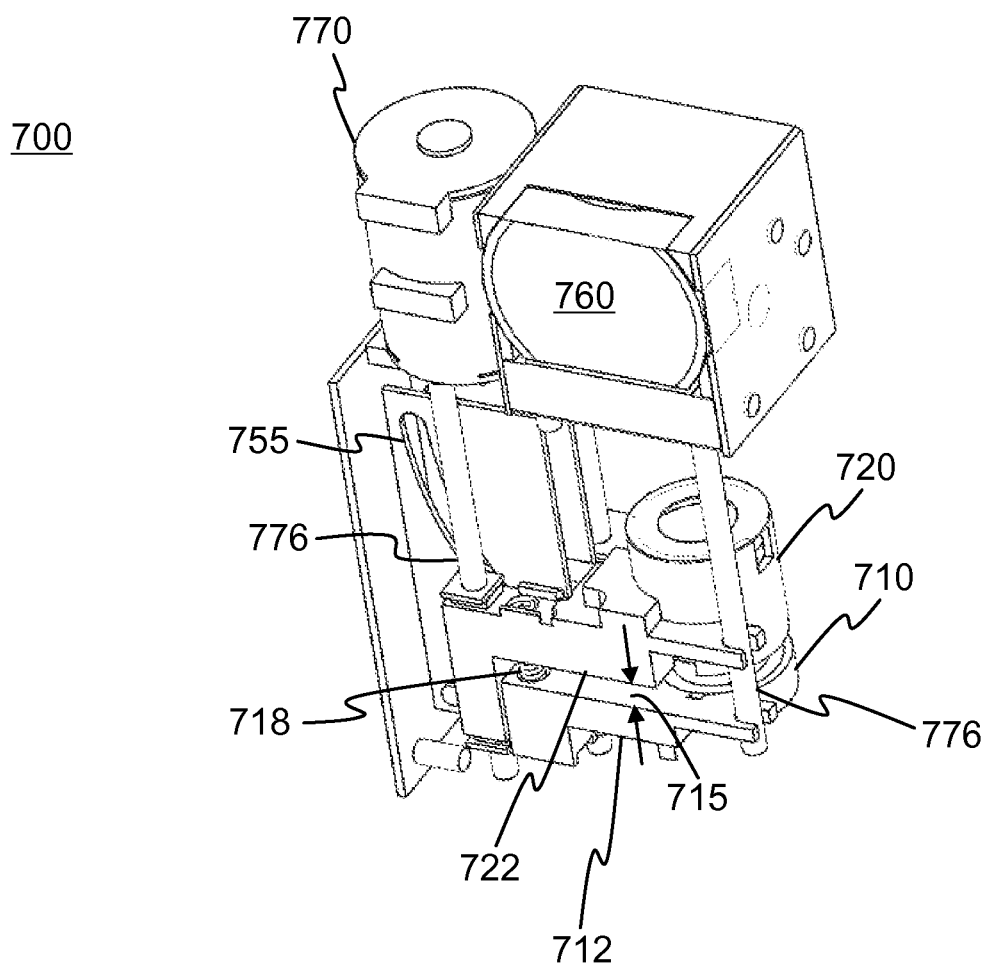
FIG. 7 is a perspective view of a compact imaging module, according to an embodiment.

FIG. 7 is a perspective view of a compact imaging module 700, according to an embodiment. Compact imaging module 700 may be similar to that shown in FIG. 6, for example. FIG. 7 may show a front view of compact imaging module 700, whereas FIG. 6 may show a rear view of the compact imaging module 700. An optical receiver 760 may receive light from an image and direct the light through a first lens assembly 710 and a second lens assembly 720. An image sensor may receive light that traveled through first lens assembly 710 and second lens assembly 720.

In addition to each comprising one or more lens, first and second lens assemblies 710 and 720 may also include structural extensions 712 and 722, as in the case for compact imaging module 400, for example. As explained above, horizontal motion of a sliding element, whose horizontal motion may be dictated by guide path 755, may impart a vertical separation 715 between first and second lens assemblies 710 and 720 as the sliding element moves horizontally. An actuator 770 may rotate a screw drive to vertically move both first lens assembly 710 and second lens assembly 720. Guide rods 776 may be located in two or more locations in compact imaging module 700 to guide first and second lens assemblies as the lens assemblies move vertically. One or more springs 718 may provide a restoring force between first and second lens assemblies 710 and 720 to counter a displacement force imparted by sliding element 740.

Figure 8:
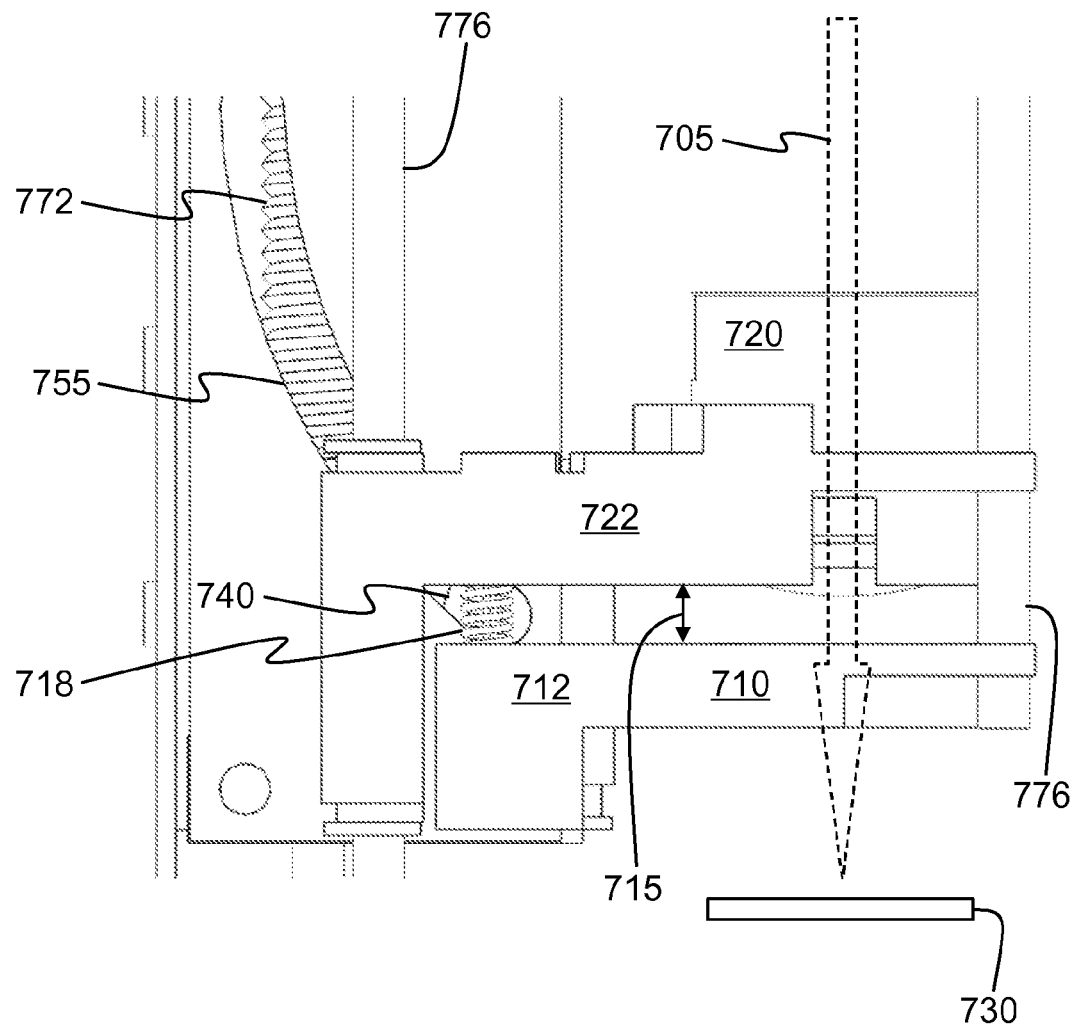
FIG. 8 is a cross-section view of a portion of a compact imaging module, according to an embodiment.

FIG. 8 is a relatively detailed cross-section view of a portion of compact imaging module 700 shown in FIG. 7, for example. Light from an image may be directed through first lens assembly 710 and a second lens assembly 720. Image sensor 730 may receive light that traveled through first lens assembly 710 and second lens assembly 720 along a light path 705, for example.

Structural extensions 712 and 722 of first and second lens assemblies 710 and 720, respectively, may be connected by one or more springs 718 to provide a restoring force between first and second lens assemblies 710 and 720.

Horizontal motion of sliding element 740, whose horizontal motion may be dictated by guide path 755, may impart a vertical separation 715 between first and second lens assemblies 710 and 720 as the sliding element moves horizontally. An actuator may rotate screw drive 772 to vertically move both first lens assembly 710 and second lens assembly 720. Guide rods 776 may be located in two or more locations in compact imaging module 700 to guide first and second lens assemblies as the lens assemblies move vertically.

Figure 9:
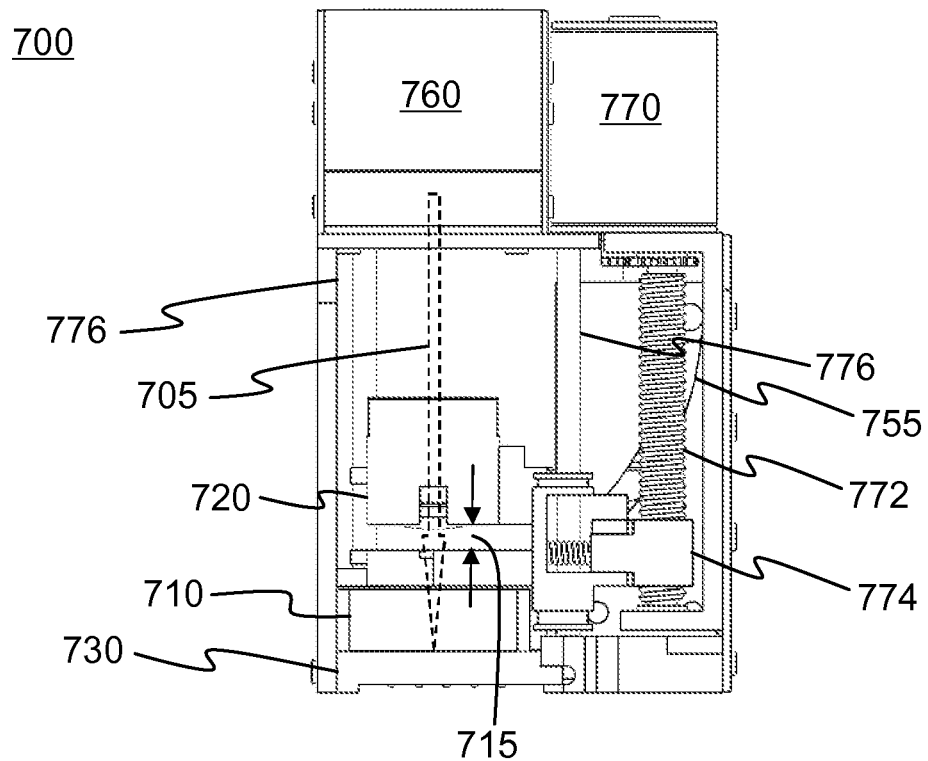
FIG. 9 is a cross-section view of a compact imaging module, according to an embodiment.

FIG. 9 is another cross-section view of compact imaging module 700, according to an embodiment. FIG. 9 may show a rear view of compact imaging module 700, whereas FIGS. 7 and 8 may show a front view of compact imaging module 700. Optical receiver 760 may receive light from an image and direct the light through a first lens assembly 710 and a second lens assembly 720. Image sensor 730 may receive light that traveled through first lens assembly 710 and second lens assembly 720.

Horizontal motion of a sliding element, whose horizontal motion may be dictated by guide path 755, may impart a vertical separation 715 between first and second lens assemblies 710 and 720 as the sliding element moves horizontally. A mechanical element 774 may be threaded to ride screw drive 772 and, as a result, to impart vertical motion to both the first and second lens assemblies. An actuator 770 may rotate screw drive 772 to vertically move both first lens assembly 710 and second lens assembly 720. Guide rods 776 may be located in two or more locations in compact imaging module 700 to guide first and second lens assemblies as the lens assemblies move vertically. Of course, such details of compact imaging module 700 are merely examples, and claimed subject matter is not so limited.

One skilled in the art will realize that a virtually unlimited number of variations to the above descriptions is possible, and that the examples and the accompanying figures are merely to illustrate one or more particular implementations.

The terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An apparatus for adjusting a zoom lens, the apparatus comprising:
a first lens assembly including a first set of one or more lenses and a second lens assembly including a second set of one or more lenses;
a first structural extension connected to the first lens assembly and a second structural extension connected to the second lens assembly;
a single actuator to mechanically drive the first lens assembly along an optical axis of the first lens assembly;
a guide element comprising a curved guide path to guide movement of a sliding element, wherein the curved guide path is arranged such that a first portion of the curved guide path is a first distance from the optical axis of the first lens assembly and a second portion is a second distance from the optical axis such that a horizontal distance between the sliding element and the optical axis is different at the first and second portions of the curved guide path, respectively;
wherein the first and second structural extensions, the sliding element, and the guide element are arranged such that responsive to the single actuator, a position of the second lens assembly along the optical axis is adjustable and to simultaneously vary a distance between the first lens assembly and the second lens assembly is variable responsive to adjustments in position of the second lens assembly; a first contact surface connected to the first lens assembly and a second contact surface connected to the second lens assembly; and
further wherein the sliding element is arranged relative the first contact surface, the second contact surface, and the curved guide path such that a separation of the first contact surface and the second contact surface is also adjustable based, at least in part, on the horizontal distance between the optical axis and the sliding element.

2. The apparatus of claim 1, wherein a separation between the first lens assembly and the second lens assembly is based, at least in part, on the distance between the optical axis and the sliding element.

3. The apparatus of claim 1, wherein the first contact surface is inclined with respect to the second contact surface.

4. The apparatus of claim 1, wherein the first contact surface is curved with respect to the second contact surface.

5. The apparatus of claim 1, further comprising one or more springs to provide a restoring force between the first lens assembly and the second lens assembly.

6. The apparatus of claim 5, wherein the sliding element is to exert a separating force on the first lens assembly and on the second lens assembly and the spring is to exert a compressive force on the first lens assembly and on the second lens assembly.

7. The apparatus of claim 1, wherein the sliding element comprises a circular roller.

8. The apparatus of claim 1, wherein the single actuator is to drive the sliding element to move along the guide path.

9. The apparatus of claim 1, wherein the sliding element is to change a separation between the first lens assembly and the second lens assembly in a first direction parallel to the optical axis responsive to movement of the sliding element in a second direction perpendicular to the first direction.

10. The apparatus of claim 1, wherein the single actuator comprises a motor.

11. The apparatus of claim 10, further comprising a screw drive to directly or indirectly drive the sliding element in response to rotation of the motor.

12. The apparatus of claim 1, wherein the optical axis is co-linear with an optical axis of the second lens assembly.

13. An apparatus comprising:
a first lens assembly comprising a first contact surface;
a second lens assembly comprising a second contact surface, wherein the first and the second lens assemblies are substantially aligned along an optical axis;
a sliding element disposed between the first and the second contact surfaces;
a guide element including a curved guide path arranged to guide movement of the sliding element, wherein the guide element is arranged relative the first and second lens assemblies such that a first portion of the curved guide path is a first distance from the optical axis and a second portion of the curved guide path is a second distance from the optical axis, the first and second distances being different such that a distance between the sliding element and the optical axis at the first portion of the curved guide path is different from a distance between the sliding element and the optical axis at the second portion of the curved guide path;
a single actuator to move the sliding element along the curved guide path; and
wherein the first and second lens assemblies, the sliding element, and the guide element are arranged such that responsive to the single actuator, a position of the second lens assembly along the optical axis is adjustable and a distance between the first lens assembly and the second lens assembly is simultaneously variably responsive to positioning adjustments of the second lens assembly, and wherein a separation between the first lens assembly and the second lens assembly is to be based, at least in part, on a horizontal distance between the optical axis and the sliding element.

14. The apparatus of claim 13, wherein a separation of the first contact surface and the second contact surface is to be based, at least in part, on a horizontal distance between the optical axis and the sliding element.

15. The apparatus of claim 13, wherein the first contact surface is inclined with respect to the second contact surface.

16. The apparatus of claim 13, wherein the first contact surface is curved with respect to the second contact surface.

17. The apparatus of claim 13, further comprising one or more springs to provide a restoring force between the first lens assembly and the second lens assembly.

18. The apparatus of claim 13, wherein the sliding element is to exert a separating force on the first lens assembly and the second lens assembly.

19. The apparatus of claim 13, wherein the sliding element comprises a circular roller.

20. The apparatus of claim 13, wherein the sliding element is to change a separation between the first lens assembly and the second lens assembly in a first direction parallel to the optical axis responsive to movement of the sliding element in a second direction perpendicular to the first direction.

21. The apparatus of claim 13, wherein the actuator comprises a motor, the apparatus further comprising a screw drive to drive the sliding element in response to rotation of the motor.

22. A method for adjusting a first lens assembly and second lens assembly of an apparatus using a single actuator, the method comprising:
mechanically driving, via the single actuator, the first lens assembly along an optical axis of the first lens assembly;
responsive to the mechanical driving by the single actuator, adjusting a position of the second lens assembly along the optical axis and simultaneously varying a distance between the first lens assembly and the second lens assembly in response to the adjusting the position of the second lens assembly and moving both vertically and horizontally a sliding element along a sliding guide so as to change a vertical separation between a first contact surface and a second contact surface; and
further responsive to the mechanical driving by the single actuator, changing a horizontal distance between the optical axis and the sliding element, and wherein the vertical separation between the first contact surface and the second contact surface is based, at least in part, on the horizontal distance between the optical axis and the sliding element.

* * * * *